June 4, 1968 R. S. CARTER ET AL 3,387,273

HIGH SPEED SERIAL PROCESSOR

Filed June 30, 1965 5 Sheets-Sheet 1

INVENTORS
RICHARD S. CARTER
WALTER W. WELZ
BY Melvin P. Williams
ATTORNEY

A CYCLE LATCH

United States Patent Office 3,387,273

Patented June 4, 1968

3,387,273

HIGH SPEED SERIAL PROCESSOR

Richard S. Carter and Walter W. Welz, Poughkeepsie, N.Y., assignors to International Business Machines Corporation, Armonk, N.Y., a corporation of New York Filed June 30, 1965, Ser. No. 468,248
10 Claims. (Cl. 340—172.5)

ABSTRACT OF THE DISCLOSURE

Disclosed is a computer apparatus for the high speed processing of operands lying in overlapping fields of memory and which eliminates the need for the redundant accessing of memory through use of a result bus connecting to a buffer. Source operands of a first cycle may be gated from memory through the buffer to a processing unit (such as arithmetic and logic circuits) for forming a result operand, which operand may be transferred back to the buffer to serve as a source operand for a next cycle without need of redundantly accessing memory.

This invention relates to data processing, and more particularly to a high speed data processor capable of performing certain serial operations in a manner so as to use a minimum of data processing cycle time.

In the data processing art, general purpose computers are provided with a variety of functional capabilities so as to perform different operations required in the processing of data and in deriving useful results therefrom. A great number of operations involve words stored in memory (or other general, readily accessible storage means), such that many operations are called for by instructions that imply the fetching of data from one or more memory locations identified by address designations within said instructions. This invention relates to a system of that type.

In certain interative or serial operations which may be performed by computers of various types, a pair of fields of data to be operated upon may be stored in sequences of memory locations when overlap one another in such a fashion that, results which are obtained and returned to the memory in a first iteration of an operation may be subsequently read out as source data for a subsequent iteration of the same operation. This is wasteful in terms of processing time, particularly when most data processing operations are then dependent more upon the slower operation of fetching and storing data in memory rather than being dependent upon one of the relatively fast processes of arithmetic or logical operations performed by electronic means.

Therefore, a primary object of the present invention to to provide for efficient handling of serial, or interative processing of data.

Another object of the invention is to provide for the processing of overlapping fields with a minimum dependency upon memory.

A further object of the invention is to provide for improved serial scanning in a data processing system by eliminating all redundant memory cycling.

An object, also, is to provide means for handling iterative processing in different ways, each way best suited to the particular operation involved.

In accordance with the present invention, when a serial operation involving memory fields overlapping in a specified relationship is to be performed, the result of each iteration is not only stored, but it also transferred to a source register so as to provide a source operand for a subsequent iteration. This not only eliminates the need to again reference memory so as to access said result for use as a source operand, but also permits multiple-operand performance in certain embodiments which would otherwise require single operand performance.

One type of general purpose data processing system is illustrated in a copending application of the same inventors and assignee, entitled "Parallel Memory, Multiple Processing, Variable Word Length Computer," Ser. No. 332,648, filed Dec. 23, 1963, now Patent No. 3,270,325.

Other objects, features and advantages of the present invention will become more apparent in the light of the following detailed description of a preferred embodiment thereof as shown in the accompanying drawings.

Figure 6:
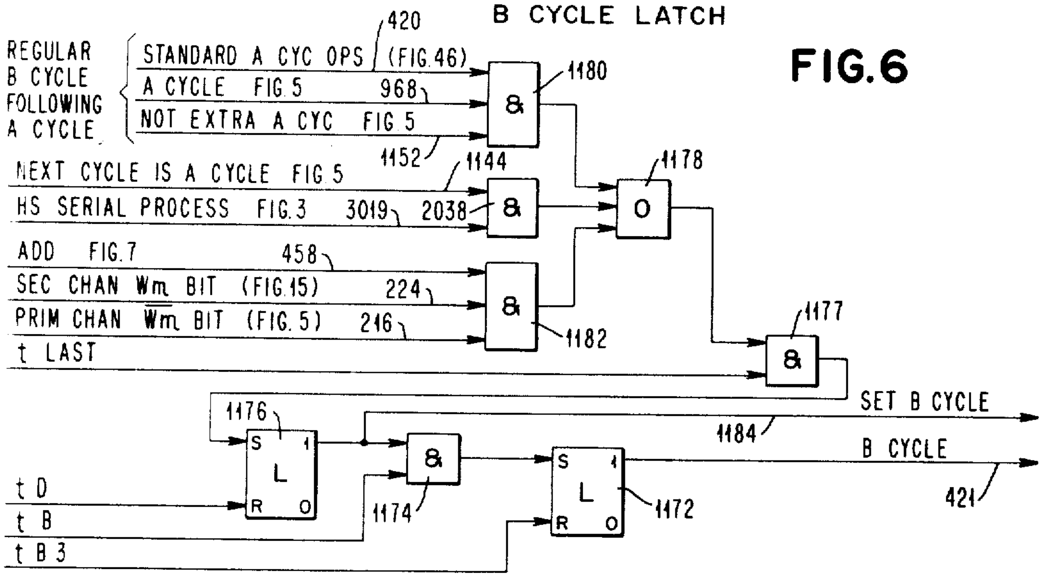
Figure 7:
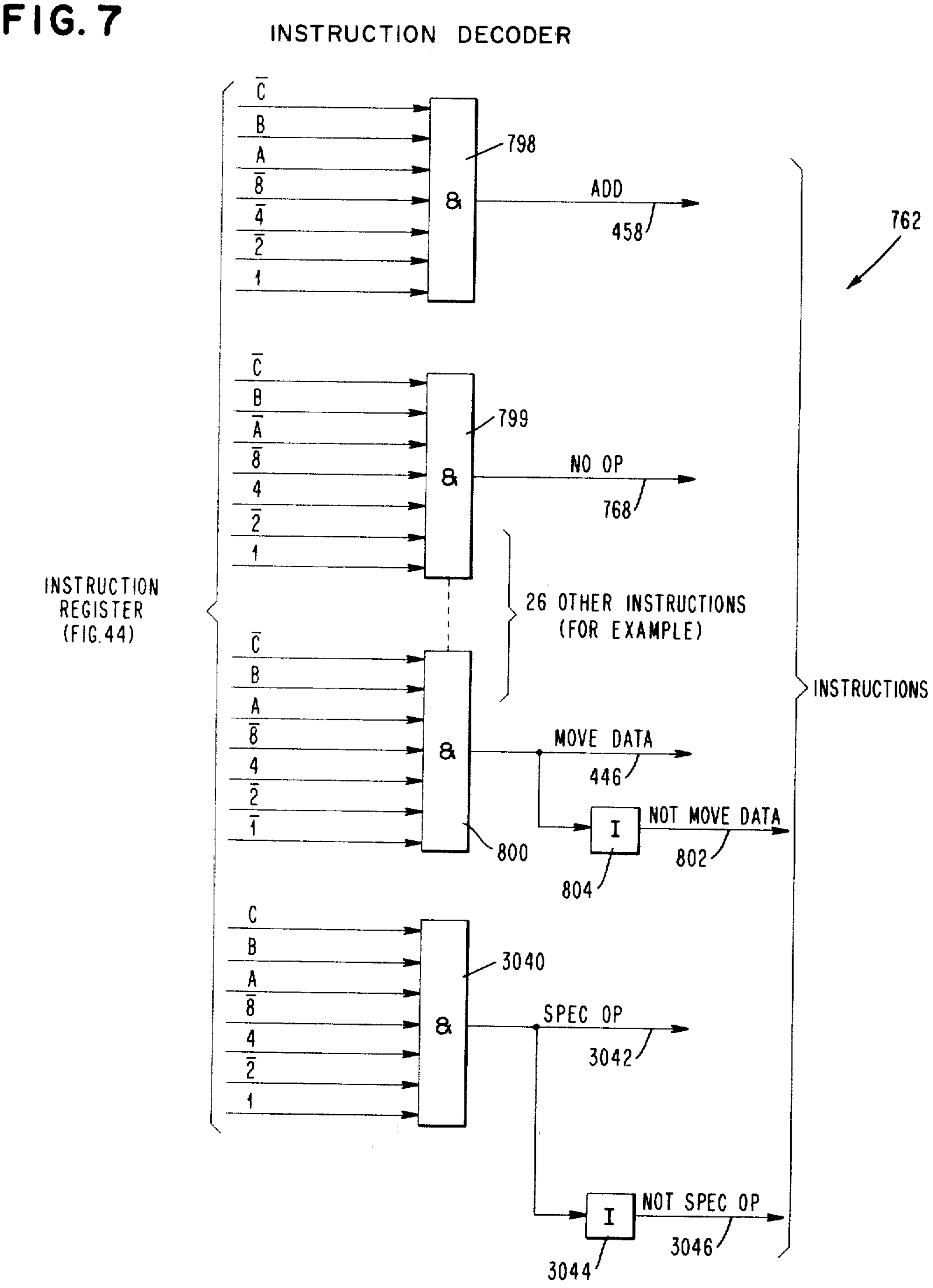

FIG. 6 is a schematic block diagram of B cycle control circuitry which comprises the B cycle latch of said copending application modified so as to generate B cycles instead of A cycles whenever high speed serial processing in accordance with the present invention is being performed; and FIG. 7 is a schematic block diagram illustrating an instruction decoder including decoding for a SPEC OP instruction.

In the system of said copending application, a typical operation (such as an add operation) is accomplished by withdrawing a character of a first field of memory, and then withdrawing a character of a second field for combination with said first field character; the results of the combination are stored in the memory location from which the second character was derived. This may be thought of as an "add-to-result" sort of operation. In the system of said copending application, the first field is called the "A field," and the second field is called the "B field." Thus, a typical ADD operation would specify the order as: readout an A character and store it temporarily in one of the secondary channel registers; readout a corresponding B character, release the A character, add A to B and store the result in B.

In said system, the memory can provide two characters of one field at one time, and special secondary channel registers (called X, Y and Z) are provided so as to permit combining two characters of a first field with two characters of a second field during each memory cycle, even though the characters of either, or both fields may not fall on regular memory boundaries. This operation is described in Section 6 of said copending application. When two character operation is involved, the order may be specified, in a simple case, as: readout a first pair of A field characters; select one and store it in one of the secondary channel registers, and then select the other and store it in another of the secondary channel registers; readout a first pair of B field characters; select one B field character and release a corresponding one of the A field characters so that the first A and first B characters are combined in the arithmetic and logic circuits; store the result in the return channel first character register; select the second B field character and release the second A field character so that the pair are combined in the arithmetic and logic circuits, passing the result through the return channel second character gate and simultaneously releasing the result stored in the return channel first character register, so that a pair of result characters are applied to the memory for storage therein at the locations from which the first pair of B field characters was derived.

In the case where the A address is one address behind the B address (in other words, one address lower than the B address in a positive scan or one address higher than the B address in a negative scan), a subsequent A address specifies one of the next characters to be operated upon, and this coincides with a current B address (which is the address of the result for the characters currently being operated upon). Inasmuch as a subsequent cycle will use the result of a preceding cycle in a serial scan operation, the system of said copending application performs serial scan operations in a single-character-per-cycle mode, so as to avoid erroneous results. This reduces performance in two ways: first, each primary memory cycle will result in only a single character processed (instead of two characters); and second, redundant secondary memory cycles are required to get an A field character which equals the previous B field result.

It is this problem to which the present invention relates.

Since the result of the prior iteration or cycle becomes an A field source for the next cycle, the present invention overcomes these problems by saving the result of one cycle for use as an operand in the next cycle. The result is available externally of the memory, so that even though the result is stored in the memory for the permanent result value thereof, it may also be utilized as the next source character by being transferred from the return channel second character gate directly over to the secondary channel registers.

Figure 1:
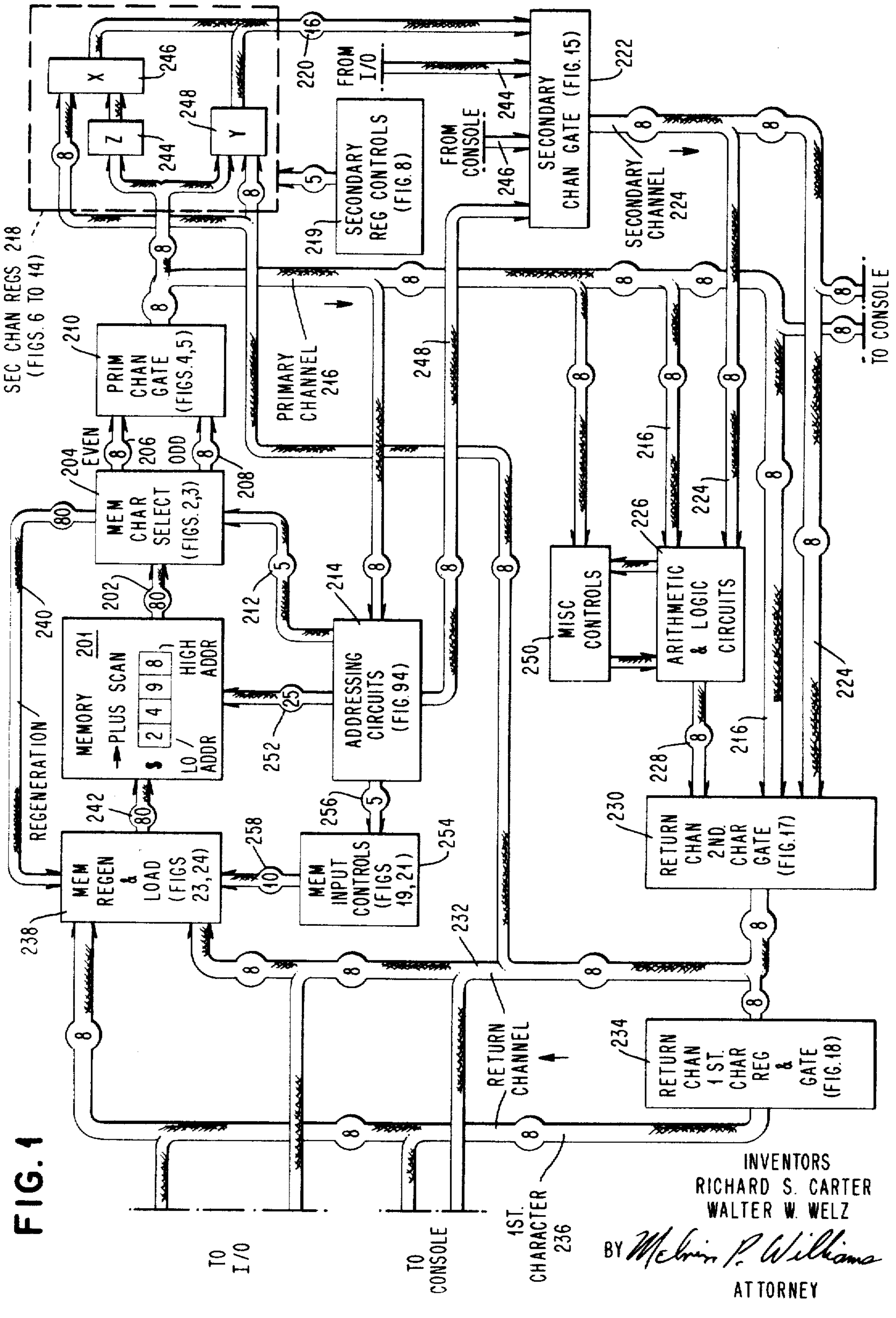
FIG. 1 is a schematic block diagram of a data processing system in accordance with the present invention, which comprises a data processing system as illustrated in said copending application, modified by the provision of a data flow connection from the return channel second character bus to the secondary channel registers.

Referring now to FIG. 1, a data processing system as shown and described in said copending application has been modified by providing a data flow connection from the return channel second character bus 232 to the secondary channel register 218. This is shown in merely an illustrative form in FIG. 1, the details of the connection to the secondary channel registers 218 being illustrated in more particularity in FIG. 2. The purpose of the connection from the return channel second character bus to the secondary channel registers is to permit using a result character of one cycle of operation as a source character for a next cycle; more specifically, in each memory cycle (such as a B cycle) there is a first character processing time and a second character processing time, whereby two pairs of characters can be combined in the arithmetic and logic circuits 226 during a particular B cycle. As shown in FIG. 1, the present invention permits a data processing system of the type described in said copending application to utilize the result of a first character processing time as a secondary source for a combination of values to be performed during a second character processing time, and to use the second character processing time result as a source character for combination during the first character time of a following B cycle, etc.

Figure 4:
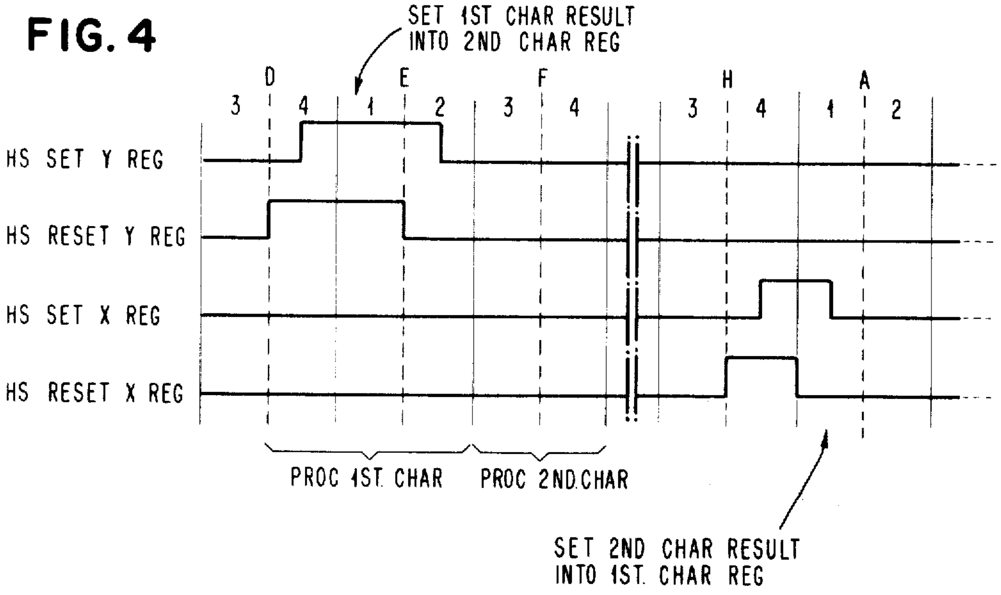
FIG. 4 is a timing diagram illustrating the timing of signals generated in FIG. 3.

The only complexity is in determining whether the resulting character from the return channel is to be placed in the X or Y register during the first character portion (CG1) or the second character portion (CG2) of each B cycle (see FIG. 4). In each B cycle, an additional pair of characters (taking into account the starting situations) which must be considered as described in said copending application will be delivered to the primary channel so that during CG1 (and during CG2) a new B character will be combined with the last result character, the result character used as an operand in CG2 being the result generated in CG1, and the CG1 source character being the result generated in CG2.

In high speed serial processing in accordance with the present invention, the Y register is used to provide a character during CG2 (the second of two characters in each B cycle) to be combined in the arithmetic and logic circuits with a second one of a pair of new characters which are derived from memory; similarly, the X register is used to provide a character during CG1 (the first character) to be combined in the arithmetic and logic circuits with a first one of a pair of characters derived from memory in each B cycle. Thus it is, that during first character process time (CG1), a first A field character is read out of the X register onto the secondary channel for combination with the first of a pair of B field characters which is provided to the primary channel; this first A field character will have already been placed in the X register at the previous A1 time (see FIG. 4) when this character was available as a second character processing time (CG2) result in the previous B cycle. When the first character result is achieved, it is made available to the Y register, and at delayed eary E time (¾ of way through D time) it is set into the Y register. Both the X and Y registers are reset just before being set, in each case.

Figure 3:
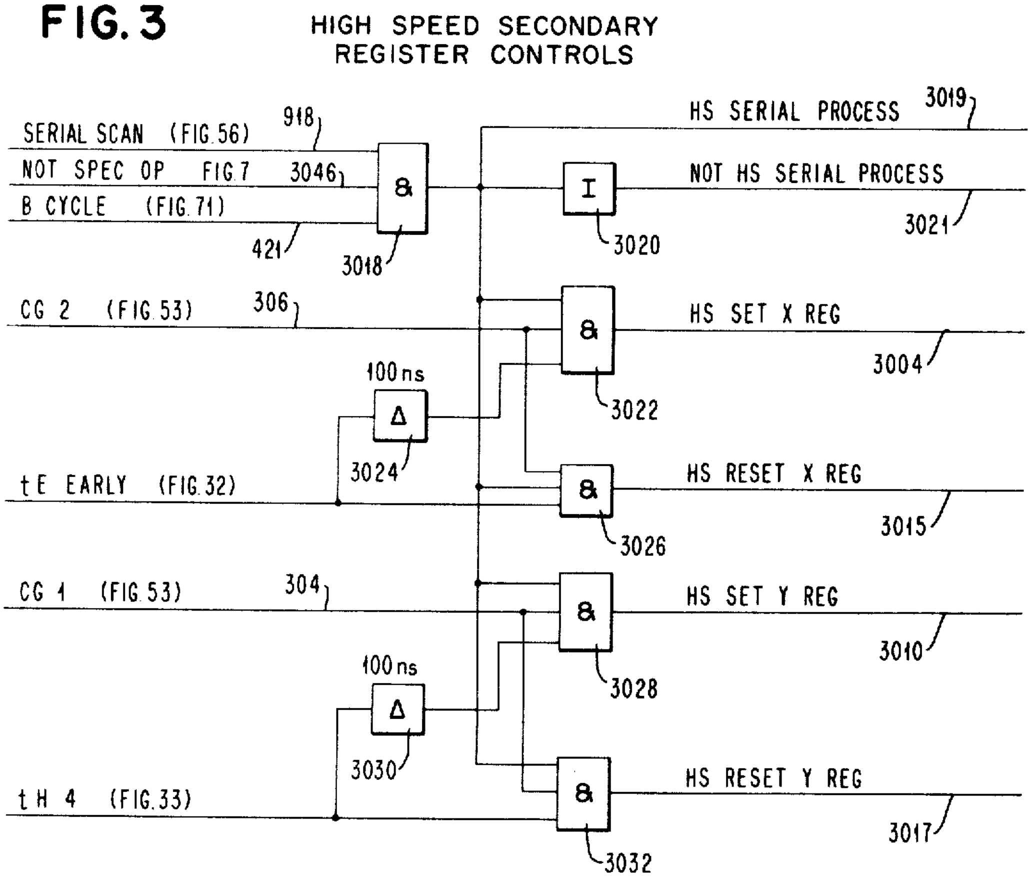
FIG. 3 is a schematic block diagram of high speed secondary register controls, which provide controls for the return channel second character bus gate illustrated in FIG. 2.

The above explains broadly the operation of the circuit of FIG. 3 which provides the set and reset signals for the X and Y registers. In fact, the operation of the circuit of FIG. 3 is somewhat obvious in view of the foregoing considerations particularly when considered in conjunction with the timing diagram of FIG. 4. The timing of the setting of the X and Y registers is the same as the setting of the result registers: specifically, the Y register is set with a first character result at the same time as the first character register is set with that result; similarly, the X register is set at a time which corresponds with the time when this character is being sent back to the memory regenerate and load circuitry. In an actual machine, the timing might be varied slightly so as to take into account normal circuit delays and other considerations; however, the operation would be conceptionally as described with respect to the timing diagram of FIG. 4, and any modifications in the timing so as to accommodate ordinary circuit conditions are those well known in the art.

Figure 2:
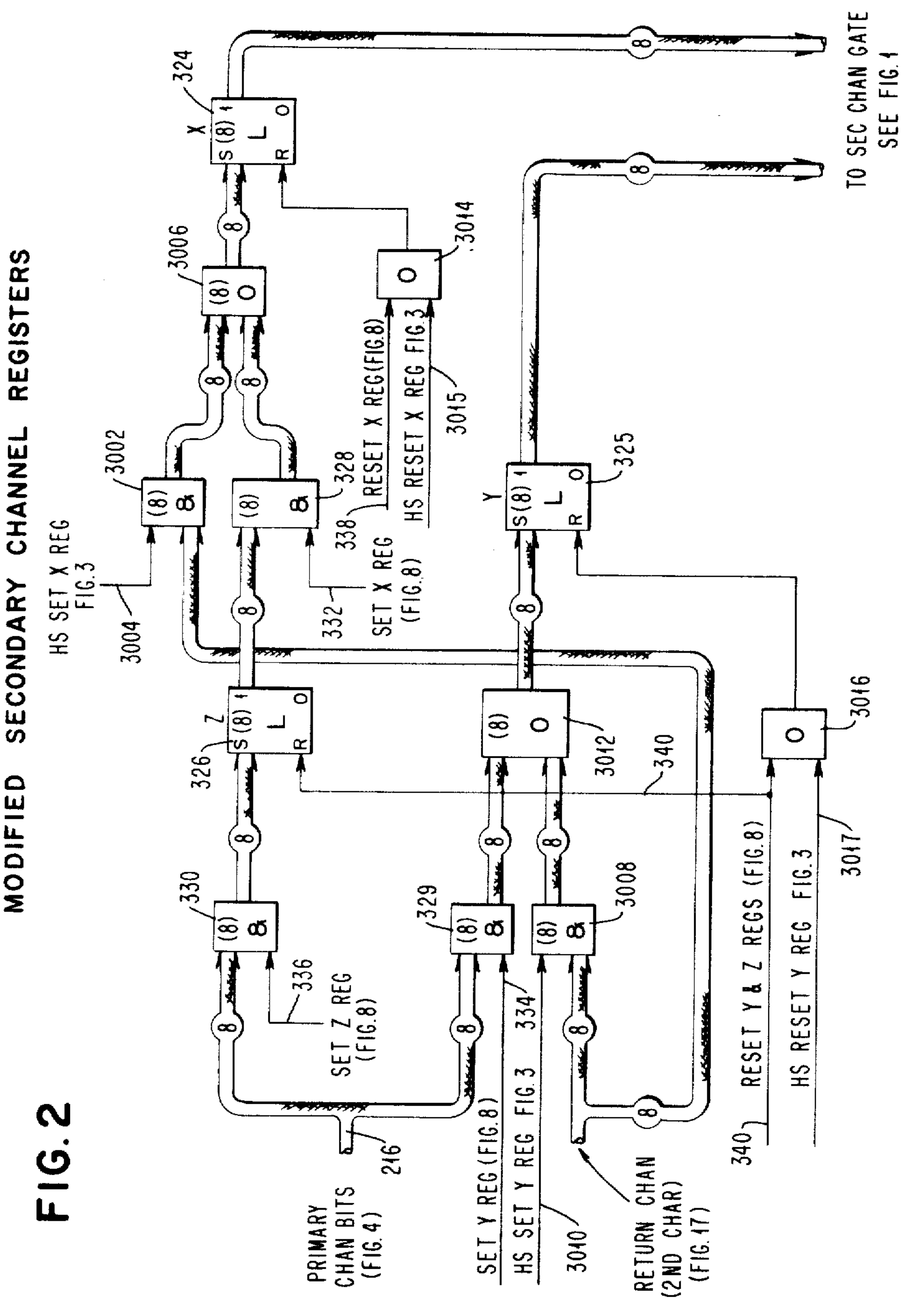
FIG. 2 is a schematic block diagram of secondary channel registers in accordance with the present invention, which comprise secondary channel registers in accordance with the system of said copending application modified so as to permit entry to data into the X and Y registers from the return channel second character bus as well as from the primary channel.

The secondary register circuits shown in FIG. 6 in said copending application are illustrated in FIG. 2 herein as modified so as to permit the system of said copending application to operate in accordance with the present invention. More specifically, in FIG. 2, each of the X and Y registers are provided with a plurality of input OR circuits 3006, 3012 so as to permit setting characters into the X and Y latches 324, 325 either from the secondary channel 216 or from the return channel second character bus 236. Each gang of eight OR circuits 3006, 3012 is responsive to a pair of gangs of eight AND circuits illustrated by the gangs of eight AND circuits 3002, 328, 329, 3008. The AND circuits 328, 329 perform the same function as they perform in said copending application, as described with respect to FIG. 6 therein. The AND circuits 3002, 3008 perform the function of gating characters from the return channel second character bus under control of signals on the HS SET X REG line 3004 and the HS SET Y REG line 3010, respectively.

Notice, in FIG. 2, that the Z register is not involved in the high speed scanning operation, due to the fact that no characters have to be saved from one cycle into the next cycle as is involved in normal memory type operations described in said copending application.

Each of the eight X register latches 324 and Y register latches 325 are reset by signals from corresponding OR circuits 3014 and 3016, respectively. The OR circuit 3014 may respond to a RESET X REG signal on a line 338 during normal operations as described in said copending application, or it may respond to a HS RESET X REG signal on a line 3015 during high-speed serial processing in accordance with the present invention. Similarly, the OR circuit 3016 responds to a normal RESET Y & Z REGS line 340 or to a HS RESET Y REG line 3017.

In summation, characters may be set into the X and Y latches by related OR circuits in response to either normal operation gates (328, 329) or in response to gates which operate only during high-speed serial scan processing (3002, 3008).

Figure 5:
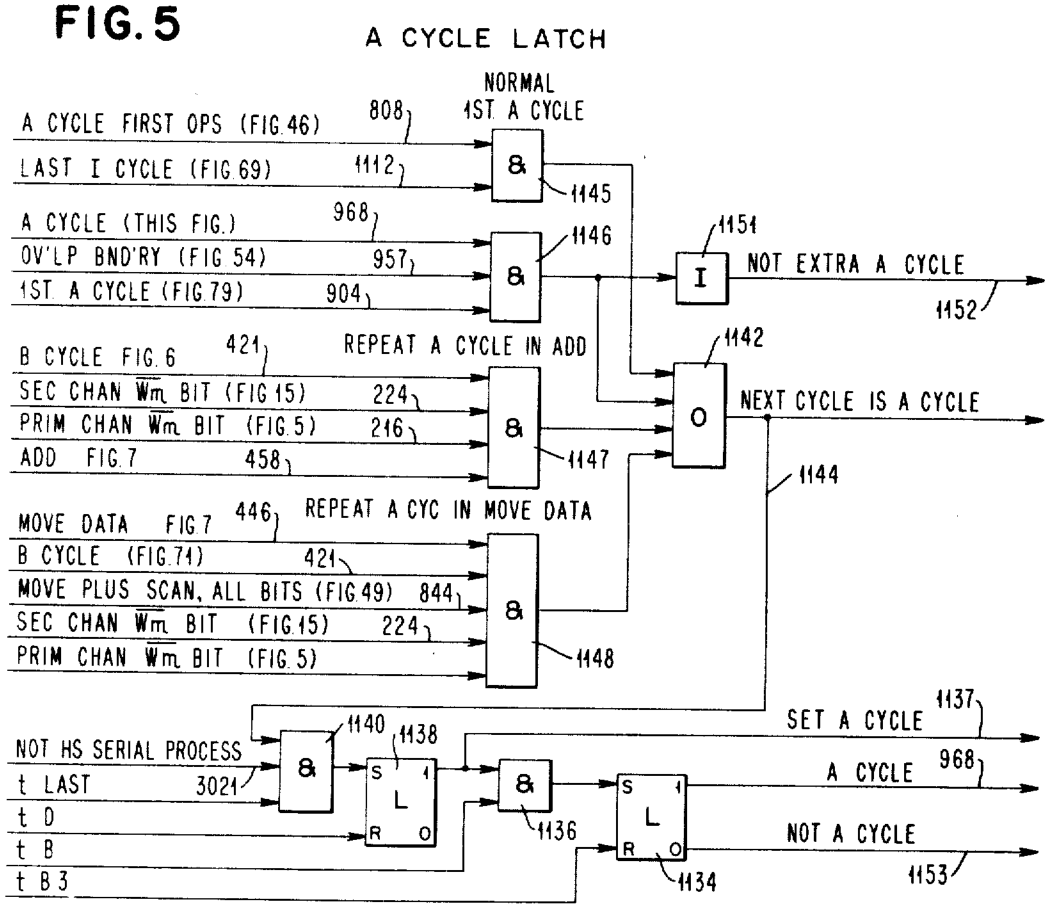
FIG. 5 is a schematic block diagram of the A cycle control circuitry, which comprises circuitry equivalent to the A cycle latch circuit of said copending application modified by the blocking of the A cycle whenever high speed serial processing in accordance with the invention is being performed.

The controls for operating the X and Y registers during high-speed serial processing are illustrated in FIG. 3. The circuitry of FIG. 3 is brought into operation only upon the occurrence of a signal on a HS SERIAL PROCESS line 3019 which is generated by an AND circuit 3018 in response to the concurrent presence of signals on the SERIAL SCAN, NOT SPEC OP and B CYCLE lines 918, 3046, 421, respectively. The HS SERIAL PROCESS signal indicates that a serial operation with overlapping fields having the A field address one location behind the B field address is to be performed. This signal controls an inverter 3020 which generates a signal on a NOT HS SERIAL PROCESS line 3021. This signal also permits gating of the selected one of four AND circuits 3022, 3026, 3028, 3032. Each of these AND circuits generates a related set or reset signal for either the X or Y register, on lines 3004, 3015, 3010, and 3017. Since the X register is utilized as a source of an operand for use during the first character process time, it will be set in accordance with the result of a second character process time. Therefore, the AND circuit 3022 responds to a signal on the CG2 line 306 and is caused to operate at a time which is delayed about 100 nanoseconds from time *t*E EARLY by a delay unit 3024 (there being approximately 200 nanoseconds to each of the times E1, H4, etc. used in the system of said copending application). The X register will be reset just before it is set due to the fact that the AND circuit 3026 responds to the same signals as the AND circuit 3022 except for the fact that the signal indicating time *t*E EARLY is not delayed as applied to the AND circuit 3026. Similarly, the Y register will be reset at time H4 during character gate one and will be set 100 nanoseconds lated due to the effect of a delay unit 3030. This timing is illustrated in FIG. 4 wherein first character process time is from the second half of B time throughout E time, and second character process time spans F time. In FIG. 5, circuitry for generating A cycles is shown. This circuit is identical in every respect to FIG. 70 of said copending application with the exception of the fact that the AND circuit 1140 is blocked during high-speed serial processing due to the requirement of a signal on a NOT HS SERIAL PROCESS line 3021. This makes it possible for successive B cycles to utilize characters transferred from the second character bus to the secondary channel registers, without taking redundant A cycles which are no longer needed. (Since the previous result has been made available within the data flow, accessing of memory for an A cycle character is not required.)

In FIG. 6, modifications have been made to the B cycle latch which is shown in FIG. 71 of said copending application. The only modification therein is the application of a signal to the OR circuit 1178 which will permit the setting of a B cycle in response to an AND circuit 2038 whenever an A cycle is being called for during high-speed serial processing. In said copending application, the signal on the NEXT CYCLE IS A CYCLE line 1144 is used only in FIG. 70, whereas this signal is utilized in FIG. 6 herein to operate the AND circuit 2038 to thereby force a B cycle during high-speed serial processing.

FIG. 7 illustrates the decoding of a SPEC OP (special operation) instruction by means of an AND circuit 3040 which responds to a particular character of input bits so as to generate the SPEC OP signal on a line 3042, which in turn controls an inverter 3044 that generates a NOT SPEC OP signal on line 3046. This NOT SPEC OP signal is utilized in FIG. 3 to cause the AND circuit 3018 to be blocked during a special operation. This is illustrative of the fact that certain operations which might cause a serial scan, yet which are not readily performable in accordance with the present invention, may be eliminated from high-speed serial processing by utilizing the related "NOT" function as an enabling signal to bring the circuitry of FIG. 3 into operation. In other words, in a complete data processing system of the type described in said copending application, it is conceivable that certain instructions might cause a serial scan, and yet these instructions are not suitable for performance in accordance with the present invention; the AND circuit 3018 is illustrative of the capability to permit high-speed serial processing in response to only certain of the operations which call for serial scan performance; all of the prohibited instructions would be performed in terms of a single character serial scan operation as described in said copending application.

As shown herein, results are applied directly to the secondary registers. However, this is because the data flow of the present embodiment is best suited for such a connection. This embodiment will permit processing two characters in each B cycle, with consecutive B cycles being contiguous. Of course, a single-character machine could use a single source register in a similar way; the source registers could be implemented in a high speed local store; the result could be buffered temporarily in one or more other registers; and sources could be controlled in more or less complicated fashion.

Although the invention has been shown and described with respect to a preferred embodiment thereof, it will be apparent to those skilled in the art that the foregoing and other changes and omissions in the form and detail thereof may be made therein without departing from the spirit and the scope of the invention.

What is claimed is:

1. In a data processing system of the type having storage means containing a plurality of addressable storage locations for storing manifestations of operands and instructions, primary channel means responsive to said storage means, secondary register means responsive to said primary channel means, a secondary channel means, arithmetic and logic means responsive to said primary channel means and said secondary channel means so as to provide a result manifestation, and wherein said result manifestation may be applied to said storage means for storage therein, high-speed serial scan apparatus, comprising:

means responsive to said arithmetic and logic circuits for directing a result manifestation to said secondary register means;

and control means for selectively storing result manifestations in said secondary register means and for selectively releasing result manifestations therefrom in dependence upon operating conditions of said system.

2. In a data processing system of the type in which a plurality of data groups may be processed during a single processing cycle, each of said data groups being specifically addressable in a memory means, said system capable of performing operations which involve two locations of memory in each effective step of said operations, process controlling means, comprising:

addressing means including first and second address registers, said registers specifying first and second locations in memory involved in one of said operations, said addressing means including means for comparing the addresses in said first and second registers, said addressing means generating a specific signal if said addresses bear a particular relationship;

means responsive to said specific signal to inhibit accessing one of said data groups;

a buffer connected to selectively receive data groups from said first and second locations in memory and having buffer input means for selectively receiving a result data group for each step of operation;

processing means connected to selectively receive source data groups from said first and second locations and from said buffer and operative to provide a result data group in each step of operation;

and secondary return means directly connecting said processing means to said buffer input means, said return means responsive to said specific signal to enter the result data group in said buffer as a source data group for a subsequent step of operation.

3. In a data processing system of the type in which operations are controlled by instruction manifestations and in which a plurality of data groups may be processed during a single processing cycle, each of said data groups being specifically addressable in a memory means, said system capable of performing operations which involve two locations of memory in each effective step of said operations, process controlling means, comprising:

addressing means including first and second address registers, said registers specifying first and second locations in memory involved in one of said operations, said addressing means including means for comparing the addresses in said first and second registers, said addressing means generating a specific signal if said addresses bear a particular relation;

instruction means for manifesting instruction of different kinds;

means responsive to said specific signal and to an instruction manifestation of a first kind to inhibit the processing of more than the data bit groups initially specified by said first and second address registers;

means responsive to said specific signal and to an instruction manifestation of a second kind to inhibit the accessing of one of said data groups;

a buffer connected to selectively receive data groups from said first and second locations in memory and having buffer input means for selectively receiving a result data group for each step of operation;

processing means connected to selectively receive source data groups from said first and second locations and from said buffer and operative to provide a result data group in each step of operation;

and secondary return means directly connecting said processing means to said buffer input means, said return means responsive to said specific signal and said instruction manifestation of a second kind to enter the result data group in said buffer as a source data group for a subsequent step of operation.

4. The device described in claim 2 wherein said addressing means includes means for modifying the address in a first one of said registers by one increment and for comparing the result of said modification with the address in the second one of said registers, said addressing means generating said specific signal if said result equals the address in said second register.

5. The device described in claim 3 wherein said addressing means includes means for modifying the address in a first one of said registers by one increment and for comparing the result of said modification with the address in the second one of said registers, said addressing means generating said specific signal if said result equals the address in said second register.

6. The device described in claim 3 wherein said instruction means includes means for generating a no-op signal in response to a particular group of manifestations, said no-op signal being an instruction manifestation of said first kind.

7. A data processing system of the type having a memory apparatus capable of delivering a plurality of groups of data bits at each access thereof, each group of data bits being specifically addressable by an address means of said system, comprising:

control means for generating a plurality of control signals;

a primary channel gate responsive to said memory apparatus;

a plurality of channels responsive to said primary channel gate, said primary channel gate being responsive to control signals for selecting at least one of said groups for application to said channels;

processing means responsive to said channels and said secondary channel to provide a result group of data bits in response to a combination of the groups of data bits on said channels;

a return channel second character gate responsive to said processing means and to said channels;

a return channel second group bus responsive to said return channel second group gate, said return channel second group gate being operative in response to control signals to selectively apply a data bit group from either said processing means or said channels to said second group bus;

a return channel first group register and gate responsive to said second group bus;

a return channel first group bus responsive to said return channel first group register and gate, said return channel first group register and gate being operative in response to control signals to temporarily store a data bit group on said second group bus, and further operative in response to control signals to cause a group stored therein to be applied to said first group bus;

a memory load circuit responsive to said second group bus and to said first group bus, said memory load circuit being operative to cause a group on either of said buses to be applied to said memory for storage therein in response to control signals;

and means responsive to said second group bus for applying said result group of data bits to one of said channels.

8. A data processing system of the type having a memory apparatus capable of delivering two groups of data bits at each access thereof, each group of data bits being specifically addressable by an address means of said system, comprising:

control means for generating a plurality of control signals;

a primary channel gate responsive to said memory apparatus;

a first channel responsive to said primary channel gate, said primary channel gate being responsive to control signals for selecting one of said characters for application to said primary channel;

a second channel register responsive to said first channel for temporarily storing a plurality of data bit groups;

a second channel gate responsive to said second channel register, said secondary channel gate being responsive to control signals for selecting a data bit group from said secondary channel register for application to said secondary channel;

processing means responsive to said first channel and said seocnd channel to provide a result group of data bits in response to a combination of the groups of data bits on said first channel and said second channel;

a third channel gate resposive to said processing means, said first channel, and said second channel;

a third channel first bus responsive to said third channel gate, said third channel gate being operative in response to control signals to selectively apply a data bit group from either said processing means, said first channel, or said second channel to said first bus;

a third channel second bus register and gate responsive to said first bus;

a third channel second bus responsive to said third channel second bus register and gate, said third channel second bus register and gate being operative in response to control signals to temporarily store a data bit group on said first bus, and further operative in response to control signals to cause a character stored therein to be applied to said second bus;

a memory load circuit responsive to said first bus and to said second bus, said memory load circuit being operative to cause a character on either of said buses to be applied to said memory for storage therein in response to control signals;

and means for selectively applying a result group of data bits on said third channel first bus to said second channel register and for inhibiting the application to said register of groups of data bits on said primary channel.

9. The device of claim 2 further including primary return means connecting said return means to said memory means for storing said result data group in one of said first or second locations.

10. The device of claim 3 further including primary return means connecting said return means to said memory means for storing said result data group in one of said first or second locations.

References Cited

UNITED STATES PATENTS

| | | | |
|---|---|---|---|
| 3,077,580 | 2/1963 | Underwood | 340—172.5 |
| 3,161,855 | 12/1964 | Propster et al. | 340—172.5 |
| 3,270,325 | 8/1966 | Carter et al. | 340—172.5 |

OTHER REFERENCES

I.B.M. Reference Manual, 1401 Data Processing System (Az4–1403–4), 1960, pages 17 to 19.

PAUL J. HENON, *Primary Examiner.*